(12) United States Patent
Mahr et al.

(10) Patent No.: US 8,505,875 B2
(45) Date of Patent: Aug. 13, 2013

(54) VACUUM VALVE

(75) Inventors: Oliver Mahr, Schlins (AT); Tamer Meseli, Altach (AT); Martin Weiss, Rankwell (AT)

(73) Assignee: VAT Holding AG, Haag (CH)

( * ) Notice: Subject to any disclaimer, the term of this patent is extended or adjusted under 35 U.S.C. 154(b) by 241 days.

(21) Appl. No.: 12/967,692

(22) Filed: Dec. 14, 2010

(65) Prior Publication Data

US 2011/0140019 A1      Jun. 16, 2011

(30) Foreign Application Priority Data

Dec. 15, 2009  (AT) .................................. A 1989/2009

(51) Int. Cl.
*F16K 25/00*      (2006.01)

(52) U.S. Cl.
USPC .......................................... 251/193; 251/328

(58) Field of Classification Search
USPC ........................... 251/193, 203, 204, 326, 328
See application file for complete search history.

(56) References Cited

U.S. PATENT DOCUMENTS

| | | | |
|---|---|---|---|
| 4,809,950 A | 3/1989 | Geiser | |
| 4,881,717 A | 11/1989 | Geiser | |
| 5,579,718 A * | 12/1996 | Freerks | 118/733 |
| 5,909,867 A | 6/1999 | Blecha | |
| 6,685,163 B2 | 2/2004 | Blecha | |
| 6,837,483 B2 * | 1/2005 | Wu | 251/328 |
| 6,899,316 B2 | 5/2005 | Duelli | |
| 7,322,561 B2 * | 1/2008 | Tauchi et al. | 251/193 |
| 2003/0160204 A1 | 8/2003 | Blecha | |
| 2009/0026717 A1 * | 1/2009 | Tsuji | 277/650 |
| 2009/0045371 A1 * | 2/2009 | Kamibayashiyama | 251/328 |
| 2009/0230342 A1 | 9/2009 | Komoto et al. | |

FOREIGN PATENT DOCUMENTS

| | | |
|---|---|---|
| CH | 698528 | 8/2009 |
| JP | 6070293 | 4/1985 |

* cited by examiner

*Primary Examiner* — John K Fristoe, Jr.
*Assistant Examiner* — Reinaldo Sanchez-Medina
(74) *Attorney, Agent, or Firm* — Volpe and Koenig, P.C.

(57) ABSTRACT

A vacuum valve with a valve housing with a valve opening, a closing element, and at least one peripherally closed seal on the closing element with first and second seal main sections and first and second seal connecting sections allocated to corresponding seat main sections and connecting sections. The seal extends in a groove defined by two side walls and a base wall. The first seal main section is arranged on a front end face of the closing element and has a middle part where the seal extends in a straight line. The seal is clamped by a clamping bar at least across part of the middle part, with the clamping bar fixed on the closing element and forming one of the side walls. Through at least one second sub-region of the longitudinal extent of the seal, the two side walls and base wall are formed by the closing element.

13 Claims, 7 Drawing Sheets

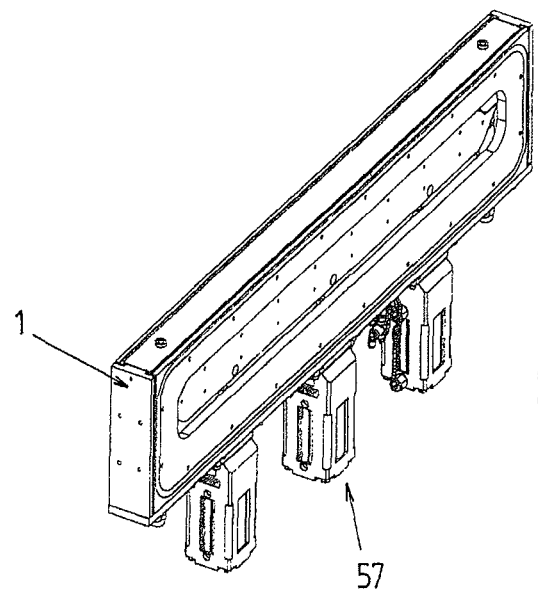
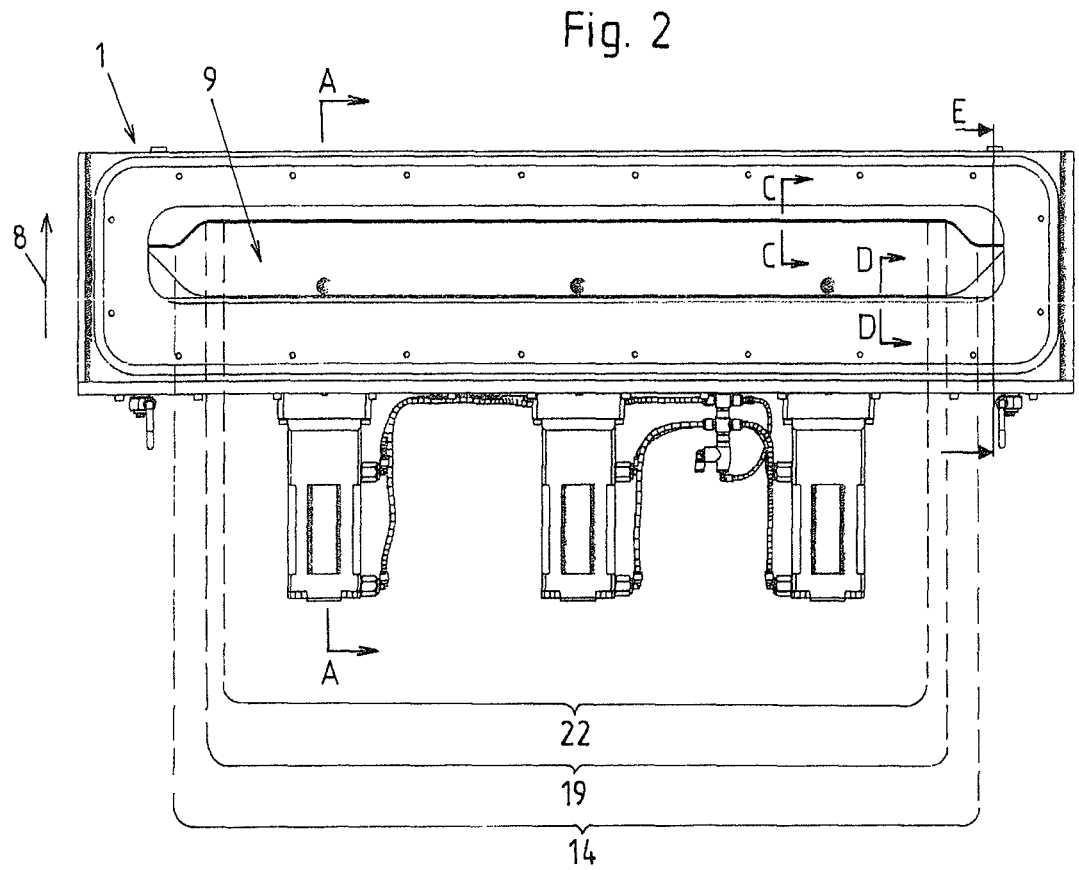

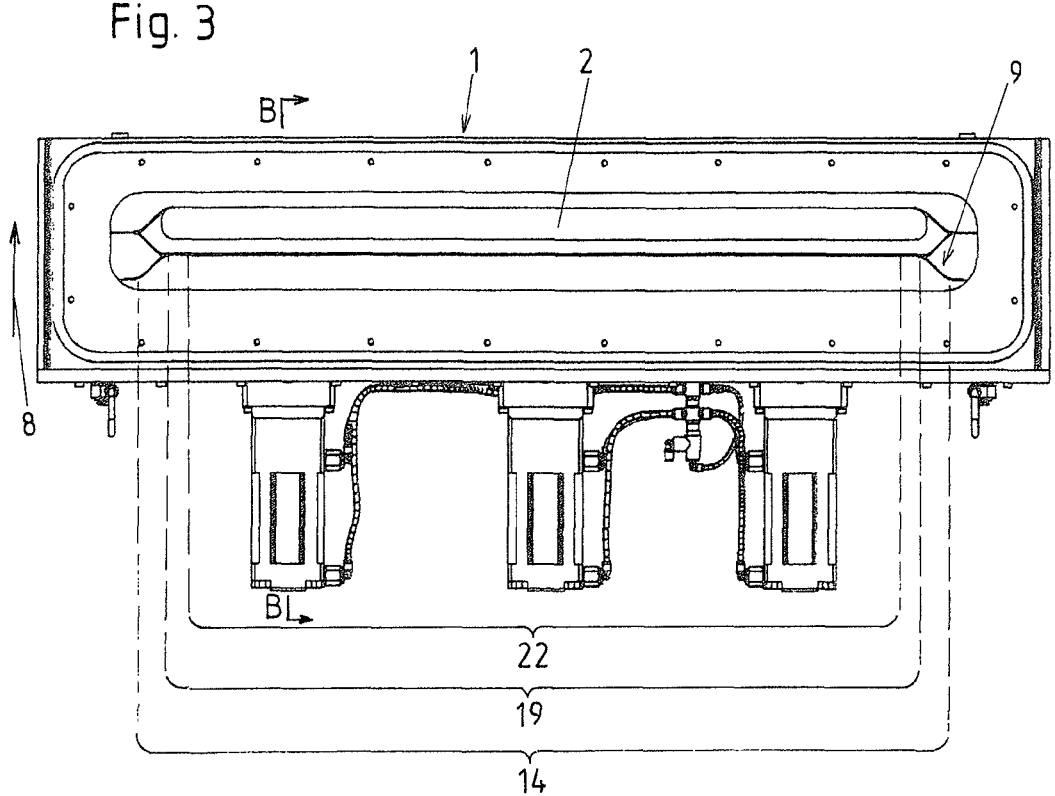
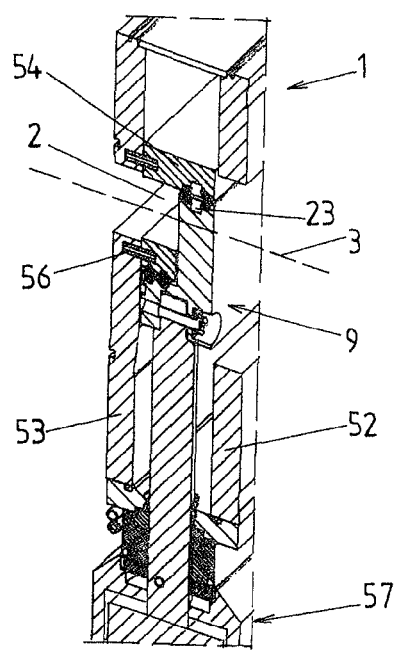
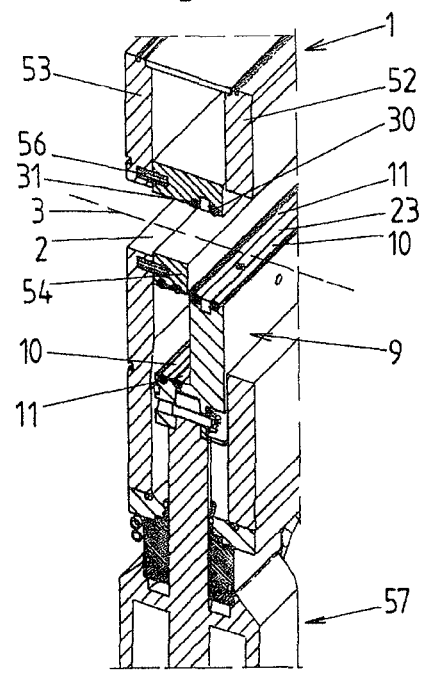

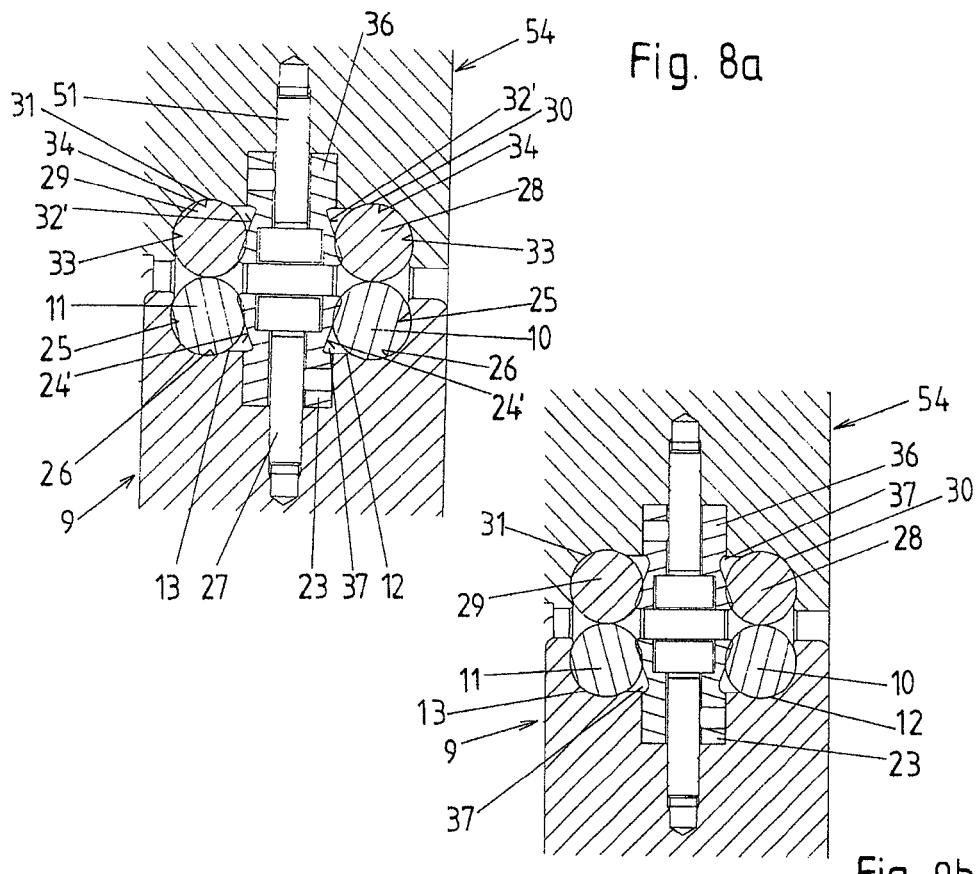
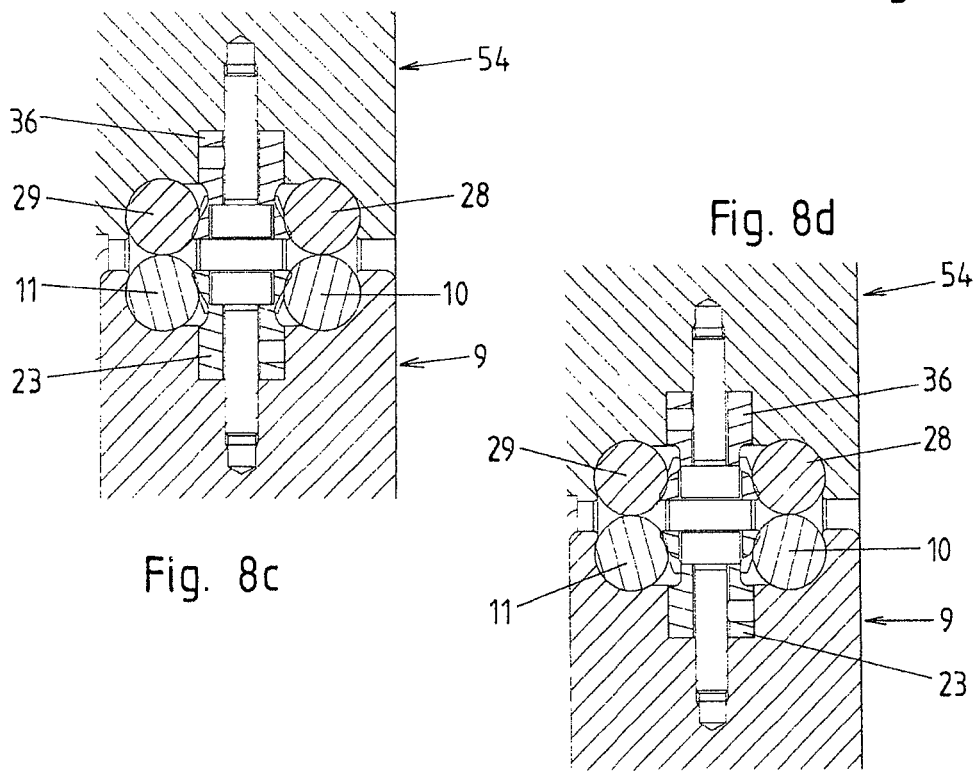

VACUUM VALVE

BACKGROUND

The invention relates to a vacuum valve comprising a valve housing with a valve opening that has an axis, a valve seat that surrounds the valve opening and has a first seat main section and a second seat main section, with these sections being offset relative to each other in the direction of the axis of the valve opening and being connected to each other by first and second seat connecting sections, a closing element that can be moved in a straight line in a closing direction at an angle to the axis of the valve opening from an open position, in which the valve opening is exposed, into a closed position, in which the valve opening is sealed, and against the closing direction from the closed position into the open position. At least one peripheral, closed seal that is arranged on the closing element and has the first and second seal main sections allocated to the first and second seat main sections and the first and second seat connecting sections and first and second seal connecting sections and extends in a groove that is bounded, viewed in cross section, by two side walls and one base wall, wherein the first seal main section is arranged on a front end face of the closing element with respect to the closing direction and has a middle part in which the seal runs in a straight line.

In vacuum installations in which belts are processed that are made from, in particular, a film material and are unwound from a roll and rolled up onto a roll after processing, the problem arises that the rolls must be replaced after they are completely unwound or wound up. For this purpose, they are arranged in separate vacuum chambers that can be separated by valves from the vacuum chambers in which the processing is performed. In this way, the valve can be closed against the material of the continuous belt. Therefore it can be avoided that the entire vacuum installation must be flooded when each roll is replaced. For this purpose, a slanted seat valve is typically used as the vacuum valve in which, for closing the vacuum valve, a closing element is guided in a straight line against a seat standing at an angle to the axis of the valve opening. One disadvantage here lies in that, among other things, the material of the belt is bent when the valve is closed.

Vacuum valves of the type noted above are known, for example, from U.S. Pat. No. 4,809,950, U.S. Pat. No. 4,881,717, U.S. Pat. No. 5,909,867, and U.S. Pat. No. 6,685,163. These valves have a simple configuration, can be closed and opened quickly by just a straight-line movement of the closing element (in contrast to, for example, L-shaped movements of the closing element for other valve types), wherein nevertheless transverse forces on the seal are avoided during the closing of the closing element and relatively few particles are released during the closing and opening process.

For these vacuum valves, the seal is typically arranged on the closing element and is pressed against a sealing face on the seat of the vacuum valve in the closed state of the vacuum valve. Usually, the seal is vulcanized on the closing element, wherein the maintenance expense is increased after wear of the seal. A seal arranged in a groove of the closing element and shaped in the form of an O-ring is likewise already known for this type of valve.

For the previously known slanted seat valve used in belt-coating installations, for better sealing, when the valve is closed against a conducted belt, a peripherally closed seal is arranged on the end both on the closing element and also on the valve seat. When the valve is closed without the conducted belt, then the seals are pressed against each other on the closing element and on the valve seat. If the valve is closed with a belt passed through the valve opening, then sections of the seals are pressed against the belt on both sides. The width of the belt is here less than the extent of the peripherally closed seals, so that sections of the seals lying next to the belt on both sides are pressed against each other.

For static seals by which two parts of a valve housing of a vacuum valve are connected to each other in a sealed manner, it has already become known to arrange the seal in a groove in which one of the two side walls of the groove is formed by a clamping bar that is screwed onto the part of the valve housing having the seal. Through such a construction, previously the configuration of an undercut groove for holding an O-ring could be simplified. With modern CNC milling machines, the configuration of an undercut groove in a solid part can be performed easily, so that the configuration with a clamping bar is more complicated and expensive.

For a sliding valve in which two valve plates of the closing element are spread apart from each other in the closed state of the vacuum valve, in order to press seals held on the plates against opposing seal faces surrounding the valve openings, a configuration of the valve plate made from bent sheet-metal parts has furthermore become known. On the corresponding valve plate, an O-ring is clamped between a bent edge of the valve plate and an annular holding element that has a bent configuration in cross section and is connected to the valve plate by spot welding. In this way, a groove holding the O-ring has been formed for a valve plate consisting of a bent metal sheet.

From U.S. Pat. No. 6,899,316, a vacuum valve emerges in which a valve plate is moved starting from an open position in which it releases the valve opening via an intermediate position in which it covers the valve opening, but is lifted from the valve seat, into a closed position pressed against the valve seat. For adjustment between the open position and the intermediate position, a first drive is used that shifts a carrier unit carrying the valve plate in a straight line. For adjustment between the intermediate position and the closed position, at least one piston-cylinder unit formed by the carrier unit is used, wherein a piston can be shifted in a cylinder recess of the carrier unit. The piston rod that carries the valve plate is sealed relative to the carrier unit by first and second seals, in order to reliably seal the excess pressure that is elevated relative to atmospheric pressure introduced into the cylinder space for adjusting the valve rod relative to the vacuum region of the vacuum valve. A channel that is connected to the atmosphere or can be evacuated opens into the space enclosed by the two seals, wherein the security of the seal relative to the excess pressure present in the cylinder space is further improved.

SUMMARY

The object of the invention is to provide an improved vacuum valve for use in vacuum installations for processing belts, wherein the vacuum valve can also be closed and the valve opening can be sealed when a belt is conducted through the valve opening.

This is possible with a vacuum valve according to the invention.

For the vacuum valve of the invention, at least one peripherally closed seal is provided that is arranged on the closing element and is clamped by a clamping bar across a first sub-region of its longitudinal extent lying in the middle part of the first seal main section. This clamping bar is fixed on the closing element, advantageously screwed with the closing element, and forms one of the two side walls of the groove in which the seal extends. The seal extends across a second sub-region of its longitudinal extent through a groove of which the two side walls and the base wall are formed in common by the closing element, that is, without a separate clamping bar being provided.

If the vacuum valve is closed, wherein a belt runs through the valve opening, then the seal is pressed against the belt at least across a part of the longitudinal extent running across the middle part of the first seal main section. In particular, elevated temperatures of the belt could lead to a certain adhesion of the seal on the belt. Through the clamping of the seal in the first sub-region of its longitudinal extent by means of the clamping bar, here the seal is prevented from ripping out from the groove when the vacuum valve is opened again. Such ripping would lead to damage to the seal, in particular, during the next closing of the vacuum valve and would result in required maintenance work.

Through the configuration of a groove constructed overall in the closing element in the second sub-region of the longitudinal extent of the seal, the overall production and assembly expense would be reduced.

Advantageously, the first sub-region of the longitudinal extent of the seal in which the clamping of the seal is realized with the clamping bar extends across more than two thirds of the longitudinal extent of the middle part of the first seal main section, especially preferred across more than 90% of this longitudinal extent. Effective securing of the seal in the groove in the middle part of the first seal main section can be achieved in this way.

An advantageous embodiment of the invention provides that the seal is clamped by a clamping bar only in the first sub-region of its longitudinal extent lying in the middle part of the first seal main section and the seal otherwise extends through a groove formed overall in the closing element (that is, without a separate clamping bar), i.e., the second sub-region of the longitudinal extent of the seal extends across the entire remaining longitudinal extent (apart from the first sub-region) of the seal.

In a preferred embodiment of the invention, first and second peripherally closed seals are arranged on the closing element at an advantageously constant spacing relative to each other. The seals each have first and second seal main sections and first and second seal connecting sections belonging to the first and second seat main sections and to the first and second seat connecting sections and extend in a corresponding groove. Both seals are clamped by a clamping bar across a first sub-region of its longitudinal extent lying in the middle part of the first seal main section, wherein this clamping bar is fixed on the closing element and advantageously screwed onto this element. The clamping bar forms one of the two side walls of the groove. Advantageously, for the two seals, a common clamping bar is provided that lies between the two seals and forms adjacent side walls of the grooves. The groove in which the seal extends is formed overall by the closing element across a second sub-region of the longitudinal extent of each seal, i.e., no clamping bar is provided there.

It is preferred that for each peripherally closed seal on the valve seat arranged on the closing element there is a peripherally closed seat seal that is pressed onto the associated seal on the closing element in the closed position of the closing element across its entire longitudinal extent, when the vacuum valve is closed without a belt passed through the valve opening. If the closing element is closed against a belt passed through the valve opening, then the seals arranged on the closing element and on the seat are pressed from opposite sides against the surface of the belt across a part of their longitudinal extent across which the belt runs between them and are pressed against each other in the remaining region of their longitudinal extent. The risk of damage to the belt is therefore reduced and the seal of the valve opening therefore can be improved by closing the valve against a belt passed through the valve opening.

Advantageously, the at least one seat seal arranged on the valve seat is clamped by a clamping bar at least across a part of the region in which it is pressed against the first sub-region of the associated seal on the closing element in the closed position of the closing element without a belt passed through the valve opening, wherein this clamping bar forms one of the two side walls of the seat-seal groove in which the seat seal runs.

For the construction in which first and second seals are arranged on the closing element and optionally also on the valve seat, advantageously at least one suction channel is provided through which the intermediate space lying between the first and second seals on the closing element and/or on the valve seat can be evacuated. Through such an intermediate suctioning, the leakage rate of the vacuum valve can be further reduced, especially when the closing element is closed against a belt passed through the valve opening.

BRIEF DESCRIPTION OF THE DRAWINGS

Additional advantages and details of the invention will be explained below with reference to the accompanying drawings. Shown in these are:

FIG. 1 an oblique view of a vacuum valve according to an embodiment of the invention, in the closed state;

FIG. 2 a view of the vacuum valve of FIG. 1;

FIG. 3 a view corresponding to FIG. 2 in the opened state of the vacuum valve;

FIG. 6 a section view along the line AA of FIG. 2;

FIG. 7 a section view along the line BB of FIG. 3;

FIGS. 8a to 8d section views along the line CC of FIG. 2 for different variants of clamping bars;

DETAILED DESCRIPTION OF THE PREFERRED EMBODIMENTS

Figure 4:
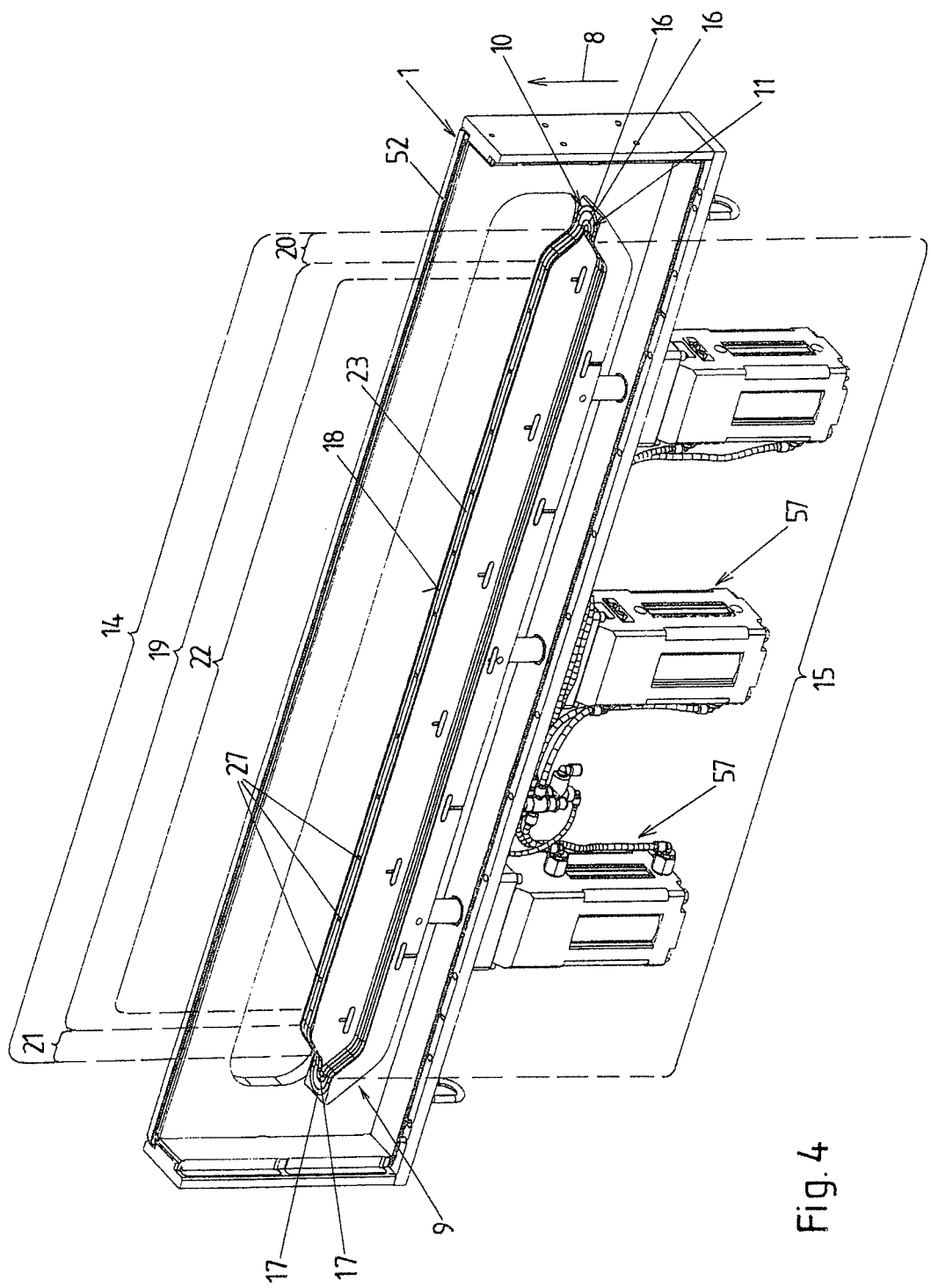
FIG. 4 an oblique view in which parts of the vacuum valve (parts of the valve housing and the valve seat) are left out.
Figure 5:
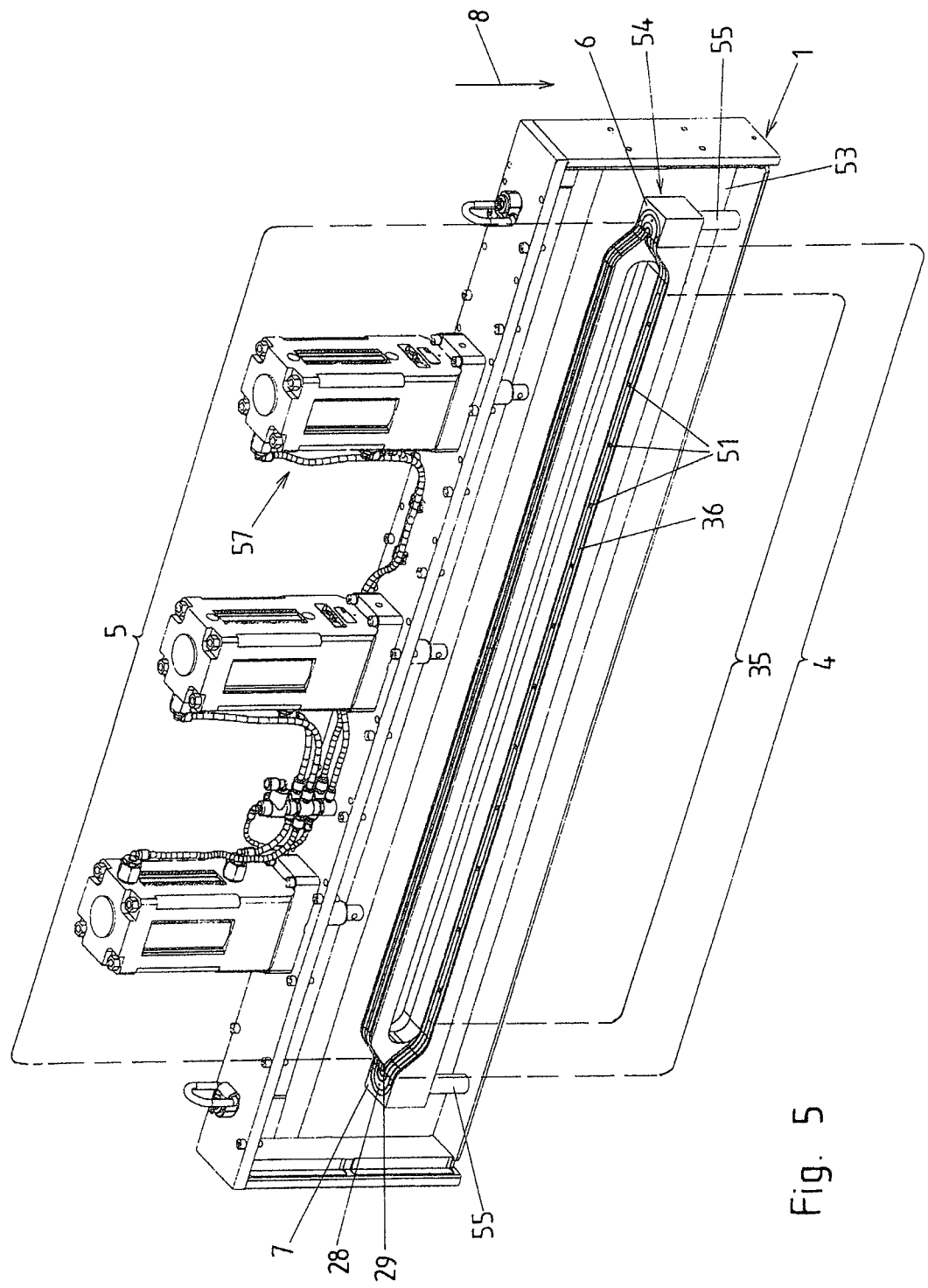
FIG. 5 an oblique view taken at a different viewing angle in which parts of the vacuum valve (parts of the valve housing and the closing element) are left out.

An embodiment of a vacuum valve according to the invention for use in vacuum installations for processing belts is shown in FIGS. 1 to 11. The vacuum valve has a valve housing 1 that has a passage or a valve opening 2 with an axis 3. The valve opening 2 is surrounded by a valve seat that has a first seat main section 4 and a second seat main section 5. The first and the second seat main sections 4, 5 are offset relative to each other in the direction of the axis 3 of the valve opening 2. The seat main sections 4, 5 lie in planes that are spaced apart from each other and that are oriented parallel to the closing direction 8 or preferably at a right angle to the axis 3. At the ends of their longitudinal extent lying on one side, the first and second seat main sections 4, 5 are connected to each other by a first seat connecting section 6 and on the other side of the ends of their longitudinal extent, the first and second seat main sections 4, 5 are connected to each other by a second seat connecting section 7. The first and second seat connecting sections 7, 8 each have a U-shaped profile.

The valve housing 1 comprises first and second wall parts 52, 53 that each have an opening for forming the passage through the valve housing 1. In the intermediate space between the wall parts 52, 53 there is the closing element 9 described below. The valve seat is arranged on a seat part 54. This is connected rigidly to other parts of the valve housing 1, for example, by rods 55 and connecting pins 56. The seat part 54 thus could also be viewed as part of the valve housing 1. The seat part 54 could also be constructed integrally with a wall part of the valve housing.

The closing element 9 of the vacuum valve can be moved in a straight line starting from an open position in which the valve opening 2 is released at least partially, advantageously completely when viewed in the direction of axis 3 (FIGS. 3 and 6) in a closing direction 8 into a closed position in which the valve opening is sealed (FIGS. 1, 2, and 7). For opening the vacuum valve, the closing element 9 is moved against the closing direction 8 from its closed position into its open position. For movement, conventionally at least one drive part 57 is used, for example, in the form of a piston-cylinder unit whose piston rod is connected to the closing element 9.

The closing direction 8 extends at an angle to the axis 3 of the valve opening 2, advantageously essentially at a right angle to the axis 3 of the valve opening 2, wherein, in this case, through the term "essentially", deviations from the right-angle arrangement of up to 25° should be included. A right-angle arrangement, as shown in the illustrated embodiment, is especially preferred.

First and second peripherally closed seals 10, 11 that are made from an elastic material and extend in first and second grooves 12, 13 are arranged on the closing element 9.

The first and the second seal 10, 11 each have first and second seal main sections 14, 15 that are allocated to the first and second seat main sections 4, 5, i.e., they lie opposite the first or second seat main section 4, 5 in the open position of the closing element 9 with respect to the closing direction 8 and lie in the closed position of the closing element 9, when no belt 38 is guided through the valve opening 2, on sealing faces of the first or second seat main section 4, 5 or corresponding to the shown embodiment and how described farther below— on sections of seat seals 28, 29 extending across the first or second seat main section 4, 5.

The first and second seal main sections 14, 15 of each of the seals 10, 11 are connected to each other by first and second seal connecting sections 16, 17. The first and second seal connecting sections 16, 17 are allocated to the first and second seat connecting sections 6, 7, i.e., in the open position of the closing element 9, they lie opposite the seat connecting sections 6, 7 with respect to the closing direction 8 and in the closed position of the closing element 9, when no belt 38 is guided through the valve opening 2, they lie on sealing faces of the first or second seat connecting section 6, 7 or on corresponding sections of seat seals that run across the seat connecting sections.

The first seal main sections 14 of the first and second seal 10, 11 lie in parallel planes spaced apart from each other. The second seal main sections 15 of the first and second seals 10, 11 lie in parallel planes spaced apart from each other. The planes of the first seal main sections 14 and the planes of the second seal main sections 15 lie parallel to each other. These planes lie parallel to the closing direction 8 and advantageously at a right angle to the axis 3.

The first and second seal connecting sections 16, 17 each have a U-shaped profile or a semicircular profile or a different profile bent around by 180°.

The second seal 11 is surrounded by the first seal 10 across its entire periphery.

The first seal main section 14 lies farther forward than the second seal main section 15 with respect to the closing direction 8. The first seal main section 14 runs across a front end face 18 of the closing element 9 with respect to the closing direction. The first seal main section 14 has a middle part 19 in which the seal 10 runs in a straight line and at a right angle to the closing direction. The front end face 18 points in the closing direction 8 across the profile of the middle part 19.

Side parts 20, 21 attach on both sides to the middle part 19 of the first seal main section 14, wherein the middle part 19 of the first seal main section 14 is connected to the corresponding seal connecting section 16, 17 by these side parts. The corresponding seal 10, 11 runs at an angle to the closing direction 8 in the side parts 20, 21 (that is, at an angle between the parallel and right-angle orientation), advantageously in an angle range from 30° to 60° to the closing direction 8.

The first and second grooves 12, 13 are bounded by two side walls 24, 24'; 25 and a base wall 26 when viewed in cross section (cf. FIGS. 8a-d, 9, and 10). The seals 10, 11 are each held in the grooves 12, 13 by positive fit. The first and second grooves 12, 13 have an undercut shape for this purpose.

The seals 10, 11 are shaped in the shown embodiment in the form of O-rings, thus they have a circular cross section. The grooves 12, 13 surround the seals 10, 11 across more than half of their periphery, in order to hold them in the grooves 12, 13 by positive fit.

Across a first sub-region 22 of its longitudinal extent that lies within the middle part of the first seal main section 14, the corresponding seal 10, 11 is clamped by a clamping bar 23. The clamping bar 23 is fixed on the closing element 9 by screws 27. The clamping bar 23 forms one side wall 24' of each groove 12, 13. The other side wall 25 and the base wall 26 are formed by material of the closing element 9.

For the two seals 10, 11, in the embodiment a common clamping bar 23 is provided, as is preferred. The clamping bar 23 lies between the two seals 10, 11 and forms the adjacent side walls 24' of the two grooves 12, 13. A configuration with a separate clamping bar 23 for each seal 10, 11 would also be possible.

The middle part 19 of the first seal main section 14 extends in the direction of the width extent of the valve opening 2 that is more than three times greater than the height extent standing at a right angle to this width extent. The width and height extents each stand at a right angle to the axis 3. Advantageously, the middle part 19 of the first seal main section 14 extends across at least 90% of the width extent of the valve opening 2. For the secure holding of each seal 10, 11 in each groove 12, 13 in the region of the middle part 19, the first sub-region 22 advantageously extends across more than two thirds of the longitudinal extent of the middle part 19, advantageously across more than three fourths of the longitudinal extent of the middle part 19.

Figure 10:
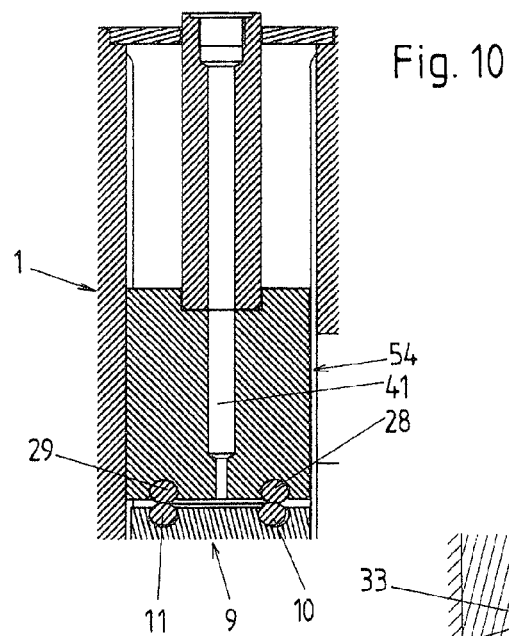
FIG. 10 a section view along the line EE of FIG. 2.
Figure 9:
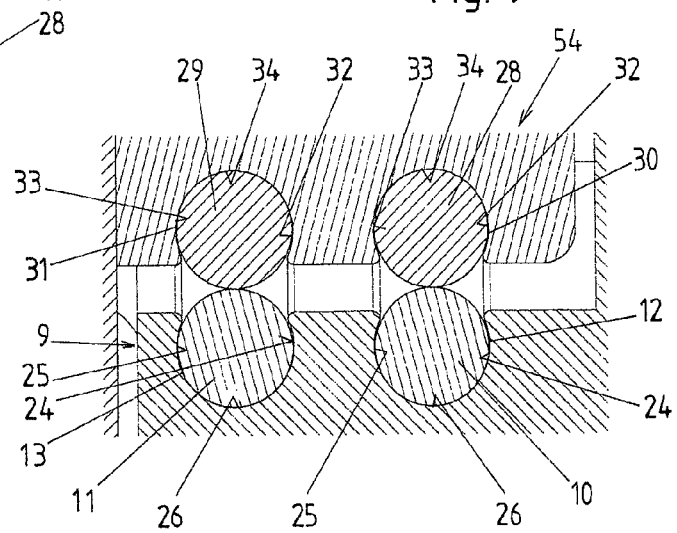
FIG. 9 a section along the line DD of FIG. 2.

Across a second sub-region of the longitudinal extent of each seal 10, 11, the grooves 12, 13 are formed overall in the closing element 9, i.e., the two side walls 24, 25 and the base wall 26, by which each groove 12, 13 is defined, are formed in common or materially integrated by closing element 9 (cf. FIGS. 9 and 10). The side and base walls 24, 25, 26 are constructed continuously when viewed in cross section in the second sub-region, that is, without breaks, e.g., by adjacent parts or materials. Here, the side and base walls 24, 25, 26 can connect continuously to each other, as shown. For example, the corresponding groove 12, 13 can be constructed with an overall circular-arc shape when viewed in cross section.

The second sub-region is formed in the shown embodiment by the entire region of the longitudinal extent of each seal 10, 11, apart from the first sub-region 22 lying in the middle part 19 of the first seal main section 14.

Indeed, a clamping of the corresponding seal 10, 11 by a clamping bar is also conceivable and possible in another sub-region in addition to the first sub-region 22, but such a clamping is preferably provided only in the first sub-region 22.

On the valve seat there are first and second peripherally closed seat seals 28, 29 that are allocated to corresponding seals 10, 11 arranged on the closing element 9. In the closed position of the closing element 9, when the closing is not performed against a belt passed through the valve opening 2 (see the description farther below), the first seal 10 arranged on the closing element 9 is pressed against the first seat seal 28 across its entire longitudinal extent and the second seal 11 arranged on the closing element 9 is pressed against the second seat seal 29 across its entire longitudinal extent. The seat seals 28, 29 are thus constructed corresponding to the first and second seals 10, 11 arranged on the closing element 9. In the regions of the longitudinal extent of the corresponding seal 10, 11 arranged on the closing element 9, wherein this seal has its seal main sections 14, 15 and its seal connecting sections 16, 17 in these regions, the seat seals 28, 29 thus likewise have first and second seal main sections and first and second seal connecting sections. In the region of the middle part 19 of the first seal main section 14 of the seal 10, 11 arranged on the closing element 9, the allocated seat seal 28, 29 has a middle part extending parallel to the middle part 19 of the corresponding seal 10, 11.

The first and second seat seals 28, 29 extend in first and second seat-seal grooves 30, 31. A corresponding seat-seal groove 30, 31 is bounded by two side walls 32, 32'; 33 and a base wall 34 when viewed in cross section. The seat seals 28, 29 are each held in the seat-seal grooves 30, 31 by positive fit. The first and second seat-seal groove 30, 31 have, for this purpose, an undercut shape.

The seat seals 28, 29 are constructed, in the shown embodiment, in the form of O-rings, thus they have a circular cross section. The seat-seal grooves 30, 31 surround the seat seals 28, 29 across more than half of their periphery, in order to hold them in the seat-seal groove 30, 31 by a positive fit.

Each seat seal 28, 29 is clamped by a seat-seal clamping bar 36 in a first sub-region 35 of its longitudinal extent (cf. FIG. 5) across which it is pressed continuously against the first sub-region 22 of the first or second seal 10, 11 in the closed position of the closing element 9, when the closing of the closing element 9 is performed without a belt 38 guided through the valve opening 2. This seat-seal clamping bar 36 forms one side wall 32' of each seat-seal groove 30, 31 and secures each seat seal 28, 29 with a positive fit against being pulled out from its seat-seal groove 30, 31.

The seat-seal clamping bar 36 is fixed on the valve seat by screws 51.

Advantageously a common seat-seal clamping bar 36 is provided for clamping both seat seals 28, 29, with this clamping bar being arranged between the first and second seat seal 28, 29 and forming the adjacent side walls 32' of the seat-seal grooves 30, 31.

In a second sub-region of the longitudinal extent of each seat seal 28, 29 that advantageously makes up the entire remaining longitudinal extent of each seat seal 28, 29 apart from the first sub-region 35, the corresponding seat seal 28, 29 is not clamped by a clamping bar, but instead formed overall in the seat part 54, i.e., the side walls 32, 33 and the base wall 34 that define each seat-seal groove 30, 31 are formed in common or materially integrated by the seat part 54. The side walls 32, 33 and base walls 34 of the first and second seat-seal grooves 30, 31 are constructed continuous when viewed in cross section in the second sub-region, that is, without breaks, e.g., by different bordering parts or materials. Here, the side and base walls 32, 33, 34 can connect to each other continuously, as shown. For example, each seat-seal groove 30, 31 can have an overall circular-arc-shaped construction when viewed in cross section.

FIGS. 8a to 8d show examples for construction possibilities of the clamping bar 23 and seat-seal clamping bar 36. The side wall 24' or 32' constructed by the clamping bar 23 or seat-seal clamping bar 36 can have different undercut shapes, in order to secure the seal 10, 11 or seat seal 28, 29 with a positive fit against being pulled out from the groove 12, 13 or seat-seal groove 30, 31. A part of each base wall 26, 34 could also be formed by the clamping bar 23 or seat-seal clamping bar 36. Each seal 10, 11 or seat seal 28, 29 is clamped above (with respect to the direction from the base of each groove toward the outside of each groove) the greatest extent of each seal 10, 11 or seat seal 28, 29 measured in the transverse direction of the groove 12, 13 or seat-seal groove 30, 31. In FIGS. 8a to 8d, for the sake of simplicity, the non-pressed shapes of the seals 10, 11 or seat seals 28, 29 are shown (so that overlapping with the clamping bar 23 or seat-seal clamping bar 36 is produced), but actually these seals are deformed accordingly relative to their non-pressed state.

Through the shape of the side wall 24', 32' formed by the corresponding clamping bar 23 or seat-seal clamping bar 36, a clearance 37 between the side wall 24' or 32' and the corresponding seal 10, 11 or seat seal 28, 29 is formed, i.e., the cross-sectional surface area of the groove 12, 13 or seat-seal groove 30, 31 is greater than the part of the cross-sectional surface area of the non-pressed seal 10, 11 or seat seal 28, 29 lying within the groove 12, 13 or seat-seal groove 30, 31. In this clearance, each seal 10, 11 or seat seal 28, 29 can expand when it is pressed during the closing of the closing element 9 or when it expands due to an elevated temperature.

Conventionally, the cross-sectional surface area of each groove 12, 13 or seat-seal groove 30, 31 is also constructed in the second sub-region in which no clamping is realized by a clamping bar 23 or seat-seal clamping bar 36 larger than the part of the cross-sectional area of the non-pressed seal 10, 11 or seat seal 28, 29 lying within the groove 12, 13 or seat-seal groove 30, 31, in order to allow expansion of each seal 10, 11 or seat seal 28, 29, when the closing element 9 is closed. The cross-sectional surface area of each groove 12, 13 or seat-seal groove 30, 31, however, is greater in the corresponding first sub-region 22 or 35 than in the corresponding second sub-region. Therefore, sufficiently large temperature expansions of each seal 10, 11 or seat seal 28, 29 can be absorbed in the first sub-region 22 or 35 when the vacuum valve is closed against a belt that has passed through the valve opening 2 and that has a relatively high temperature.

In FIGS. 1, 2, 6, 8a to 8d, 9, and 10, the closed state of the vacuum valve is shown without a belt passed through the valve opening 2. In this case, the first seal 10 is pressed onto the first seat seal 28 and the second seal 11 is pressed onto the second seat seal 29 across their entire longitudinal extents.

Figure 11:
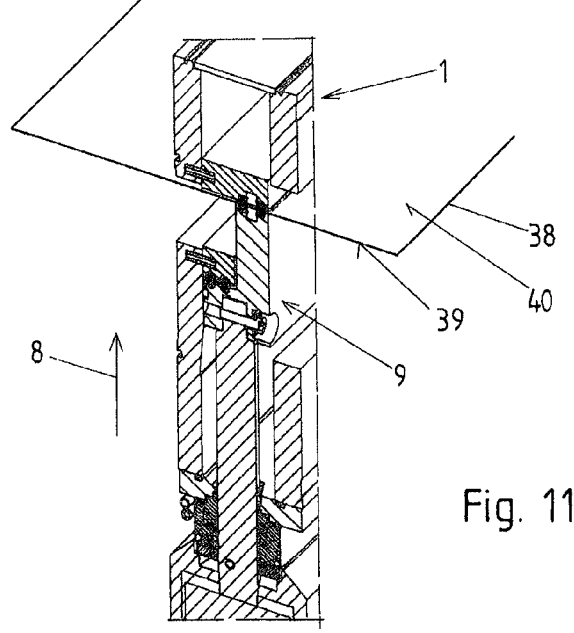
FIG. 11 a diagram analogous to FIG. 6 but with a belt passed through the valve opening and against which the closing element is closed.

In FIG. 11, the closed state of the vacuum valve is shown with a belt 38 passed through the valve opening 2 in a diagram analogous to FIG. 6. The belt 38 lies in a plane extending at a right angle to the closing direction 8. The first and second seal 10, 11 and the first and second seat seal 28, 29 are pressed opposite each other onto the two side faces 39, 40 of the belt 38 and indeed across the region of the width extent of the valve opening 2 across which the belt 38 extends. In regions next to the belt 38, the first seal 10 and first seat seal 28 and the second seal 11 and second seat seal 29 are pressed against each other, in turn.

The thickness of the belt 38 is advantageously less than 1 mm. The belt 38 could also be designated as a belt-shaped film.

From the section of FIG. 10, a suction channel 41 running through the valve housing can be seen through which the intermediate space can be evacuated that lies—when the vacuum valve is closed without a belt 38 passed through the valve opening 2—between the mutual contact region between the first seal 10 and first seat seal 28 and the mutual contact region between the second seal 11 and second seat seal 29. When the vacuum valve is closed against a belt 38 guided through the valve opening 2, then the intermediate space lying between the first and second seat seal 28, 29 is suctioned through the suction channel 41, with each of these seals contacting one side face 40 of the belt 38. For suctioning the clearance lying between the first and second seals 10, 11 that each contact the other side face 39 of the belt 38, at least one suction channel opening into this clearance through the closing element 9 could be provided. Through an intermediate suctioning between the first and second seat seal 28, 29 and/or between the first and second seal 10, 11, the residual flow through the valve opening 2 can be reduced in the closed state of the vacuum valve.

Figure 12:
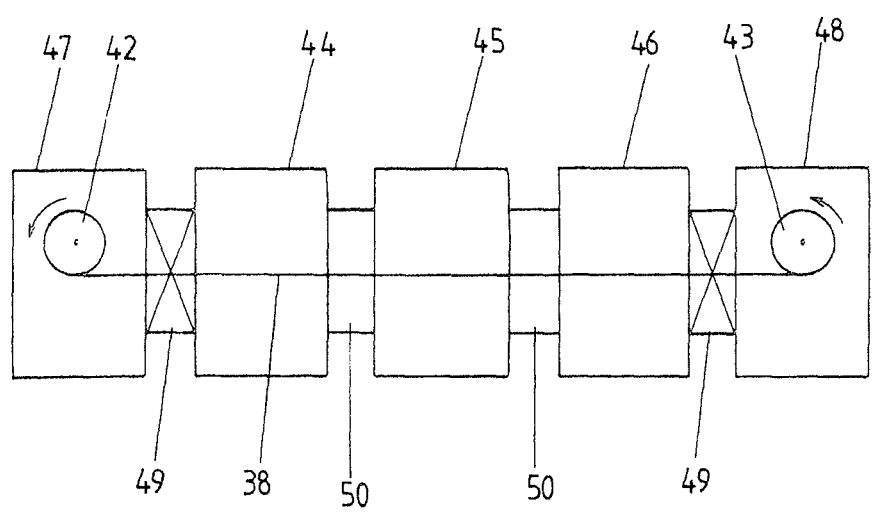
FIG. 12 a schematic diagram of a vacuum installation for processing a belt with valves according to the invention used in this installation.

In FIG. 12, a vacuum installation is shown schematically that is used for processing a belt 38 under vacuum conditions, for example, for performing coatings. Such vacuum installations are used, for example, for the production of solar cells, LED's, or OLED's constructed by coating. The belt 18 is unrolled from a first roll 39 and after processing rolled onto a second roll 40. It could involve, in particular, a film in belt shape. The belt 38 is guided between the first and second rolls 39, 43 through at least one vacuum chamber 44, 45, 46 in which a processing step is performed. The rolls 39, 43 are arranged in separate vacuum chambers 44, 45, 46, 45 that are each connected to the other vacuum chambers 41-43 by a vacuum valve 46 according to the invention.

When the supply of the belt 38 in the roll 39 is exhausted, the vacuum valve 46 is closed against the conducted belt 38 and a new roll 42 is inserted, wherein the start of the belt of this roll is connected to the end of the belt of the previous roll. The vacuum chamber 44, 45, 46 is pumped down and the vacuum valve 49 is opened. An analogous process is performed when the roll 43 with the rolled-up, processed belt is to be replaced by an empty roll. In this way, flooding of the vacuum chambers 44-46 when changing the rolls 42, 43 can be avoided.

Between the vacuum chambers 43-46 in which processing steps are carried out, there can only be connecting pieces 50 or similarly there can be, at least partially, vacuum valves 49 according to the invention, so that one of these chambers 44-46 could also be serviced, without flooding the entire system.

The seals 10, 11 and seat seals 28, 29 can be made, for example, from Viton (FKM) or from another suitable elastic material, for example, FFKM.

Different modifications of the shown embodiment are conceivable and possible without leaving the scope of the invention. For example, only one seal on the closing element 9 and one seat seal on the valve seat could be provided that are pressed against each other or partially against each other in the closed state of the vacuum valve and are pressed from opposite sides onto a belt 38 passed through the valve opening 2.

The at least one seat seal 28, 29 could also be eliminated, wherein a sealing face would be arranged on the valve seat, wherein the at least one seal 10, 11 arranged on the closing element would be pressed against this sealing face across its entire longitudinal extent in the closed state of the vacuum valve, when the vacuum valve is closed without a belt 38 passed through the valve opening 2. If the vacuum valve is closed with a belt 38 passed through the valve opening 2, then the belt 38 in this case would contact with a side face 39 in the middle part 19 of the at least one seal 10, 11 and with the other side face 40 against a middle part of the first seat main section 4.

The seals 10, 11 or seat seals 28, 29 could also have a different cross-sectional shape than that of an O-ring. The grooves 12, 13 or seat-seal grooves 30, 31 were to be adapted accordingly in their shape, wherein the seals 10, 11 and seat seals 28, 29 were held in turn with positive fits in the grooves 12, 13 or seat-seal grooves 30, 31 and in this way were clamped at least in the first sub-region by a clamping bar 23 or seat-seal clamping bar 36.

LEGEND TO THE REFERENCE SYMBOLS

1 Valve housing
2 Valve opening
3 Axis
4 First seat main section
5 Second seat main section
6 First seat connecting section
7 Second seat connecting section
8 Closing direction
9 Closing element
10 First seal
11 Second seal
12 First groove
13 Second groove
14 First seal main section
15 Second seal main section
16 First seal connecting section
17 Second seal connecting section
18 Front end face
19 Middle part
20 Side part
21 Side part
22 First sub-part
23 Clamping bar
24, 24' Side wall
25 Side wall
26 Base wall
27 Screw
28 First seat seal
29 Second seat seal
30 First seat-seal groove
31 Second seat-seal groove
32, 32' Side wall
33 Side wall
34 Base wall
35 First sub-region
36 Seat-seal clamping bar
37 Clearance
38 Belt
39 Side face
40 Side face
41 Suction channel 42 Roll
43 Roll
44 Vacuum chamber
45 Vacuum chamber
46 Vacuum chamber
47 Vacuum chamber
48 Vacuum chamber
49 Vacuum valve
50 Connection piece
51 Screw
52 Wall part
53 Wall part
54 Seat part
55 Rod
56 Connectin pin
57 Drive

The invention claimed is:

1. Vacuum valve comprising:
a valve housing with a valve opening that has an axis,
a valve seat that surrounds the valve opening and has a first seat main section and a second seat main section;
the first and second seat main sections being arranged offset relative to each other in a direction of the axis of the valve opening and being connected to each other by first and second seat connecting sections;
a closing element that is moveable in a straight line in a closing direction extending at an angle to the axis of the valve opening from an open position in which the valve opening is exposed into a closed position in which the valve opening is sealed and against the closing direction from the closed position into the open position;
first and second peripherally closed seals that are arranged on the closing element and each have first and second seal main sections and first and second seal connecting sections allocated to the first and second seat main sections and the first and second seat connecting sections;
each of the peripherally closed seals extends in a respective groove that are each bounded, viewed in cross section, by two side walls and one base wall;
the first seal main sections are arranged on a front end face of the closing element with respect to the closing direction and each has a respective middle part in which each of the seals extends in a straight line;
the first and second seals are each clamped by a clamping bar at least across a first sub-region of a longitudinal extent thereof lying in the middle part of the respective first seal main sections;
the clamping bar is fixed on the closing element and forms one of the two side walls of the corresponding groove; and
the two side walls and the base wall defining the corresponding groove are formed by the closing element across at least a second sub-region of the longitudinal extent of each of the seals.

2. Vacuum valve according to claim 1, wherein the middle part of the first seal main section runs in a direction of a width extent of the valve opening that is more than three times greater than a height extent of the valve opening extending at a right angle to the width extent.

3. Vacuum valve according to claim 1, wherein the first sub-region of the longitudinal extent of the seal in which the seal is clamped by the clamping bar extends across more than two thirds of the longitudinal extent of the middle part of the first seal main section.

4. Vacuum valve according to claim 1, wherein the seal is clamped by the clamping bar only in the first sub-region of the longitudinal extent lying in the middle part of the first seal main section.

5. Vacuum valve according to claim 1, wherein a cross-sectional surface area of the groove in the first sub-region is greater than in the second sub-region.

6. Vacuum valve according to claim 1, wherein the first and second seals are each clamped in the first sub-region of the longitudinal extent thereof lying in the corresponding middle part of the first seal main section by the clamping bar which is a common clamping bar that is arranged between the two seals and forms the adjacent side walls of the two grooves in the first sub-regions of the longitudinal extents of the first and second seals.

7. Vacuum valve according to claim 6, wherein the clamping bar clamping the at least one seal is screwed to the closing element.

8. Vacuum valve according to claim 1, wherein at least a suction channel is provided through which an intermediate space lying between the two seals can be evacuated.

9. Vacuum valve comprising:
a valve housing with a valve opening that has an axis,
a valve seat that surrounds the valve opening and has a first seat main section and a second seat main section,
the first and second seat main sections being arranged offset relative to each other in a direction of the axis of the valve opening and being connected to each other by first and second seat connecting sections;
a closing element that is moveable in a straight line in a closing direction extending at an angle to the axis of the valve opening from an open position in which the valve opening is exposed into a closed position in which the valve opening is sealed and against the closing direction from the closed position into the open position;
at least one peripherally closed seal that is arranged on the closing element and has first and second seal main sections and first and second seal connecting sections allocated to the first and second seat main sections and the first and second seat connecting sections and extends in a groove that is bounded, viewed in cross section, by two side walls and one base wall;
the first seal main section is arranged on a front end face of the closing element with respect to the closing direction and has a middle part in which the seal extends in a straight line;
the seal is clamped by a clamping bar at least across a first sub-region of a longitudinal extent thereof lying in the middle part of the first seal main section, wherein the clamping bar is fixed on the closing element and forms one of the two side walls of the groove;
the two side walls and the base wall defining the groove are formed by the closing element across at least a second sub-region of the longitudinal extent of the seal; and
a peripherally closed seat seal is arranged on the valve seat, the seat seal is pressed onto the associated seal on the closing element across an entire longitudinal extent in the closed position of the closing element without a belt guided through the valve opening and extends in a seat-seal groove that has two side walls and one base wall.

10. Vacuum valve according to claim 9, wherein the corresponding seat seal is clamped by a seat-seal clamping bar at least across a part of a first sub-region of a longitudinal extent in which it is pressed onto the first sub-region of the associated seal on the closing element in the closed position of the closing element without a belt guided through the valve opening, wherein the clamping bar is fixed on the valve housing and forms one of the two side walls of the seat-seal groove, and the two side walls and the base wall that define the seat-seal groove are formed by the valve housing or a seat part connected rigidly to the housing across a second sub-region of the longitudinal extent of the corresponding seat seal.

11. Vacuum valve according to claim 10, the peripherally closed seat seal includes first and second seat seals that are provided that are each clamped in the first sub-region of a longitudinal extent by the seat seal clamping bar which is a common seat-seal clamping bar that is arranged between the two seat seals; and forms the adjacent side walls of the two seat-seal grooves in the first sub-regions of the longitudinal extents of the first and second seat seals.

12. Vacuum valve according to claim 11, wherein the at least one peripherally closed seal includes first and second peripherally closed seals that are arranged on the closing element and each have first and second ones of the seal main sections and first and second ones of the seal connecting sections allocated to the first and second seat main sections and the seat connecting sections and each extend in a respective one of the grooves that are each defined by two of the side walls; and one of the base walls when viewed in cross section, wherein the first seal main sections are arranged on the front end face of the closing element with respect to the closing direction and each have respective middle parts in which each of the seals extends in a straight line, and the first and the second seal are each clamped by the clamping bar across at least a first sub-region of the longitudinal extent lying in the middle part of the first seal main section, wherein the clamping bar is fixed on the closing element and forms one of the two side walls of the corresponding groove, and the two side walls and the base wall defining the corresponding groove are formed by the closing element across a second region of the longitudinal extent of each seal.

13. Vacuum valve according to claim 11, wherein at least a suction channel is provided through which an intermediate space lying between the two seat seals can be evacuated.

* * * * *